(No Model.)

M. J. CUSHING.
SIFTING SHOVEL.

No. 427,055. Patented May 6, 1890.

WITNESSES:
Charles A. Herbert
William Anderson

INVENTOR
Maria J. Cushing
BY James A. Whitney
ATTORNEY

UNITED STATES PATENT OFFICE.

MARIA J. CUSHING, OF NEW YORK, N. Y.

SIFTING-SHOVEL.

SPECIFICATION forming part of Letters Patent No. 427,055, dated May 6, 1890.

Application filed September 23, 1889. Serial No. 324,717. (No model.)

*To all whom it may concern:*

Be it known that I, MARIA J. CUSHING, of the city, county, and State of New York, have invented certain new and useful Improvements in Sifting-Shovels; and I do hereby declare that the following is a full, clear, and exact description of the invention, which will enable others skilled in the art to which it appertains to make and use the same.

This invention relates to that class of devices which are employed for the double purpose of shoveling coal and other similar materials and of separating therefrom the dust, smaller particles, and other refuse.

It consists in certain novel means whereby is provided a sifting-shovel strong, simple, and durable in construction, and with which the sifting operation may be performed in a rapid and effective manner and with comparatively little exertion on the part of the operator, and with comparatively slight exposure of the person to the dust, &c., from the material while being sifted and shoveled.

Figure 1:
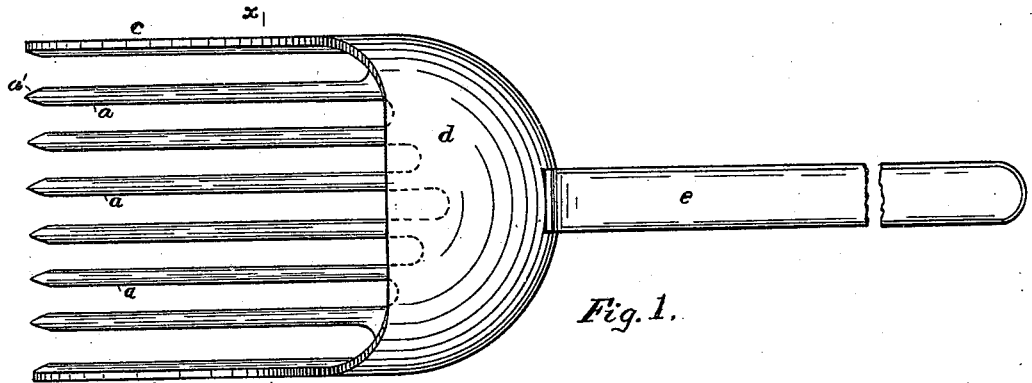
Figure 2:
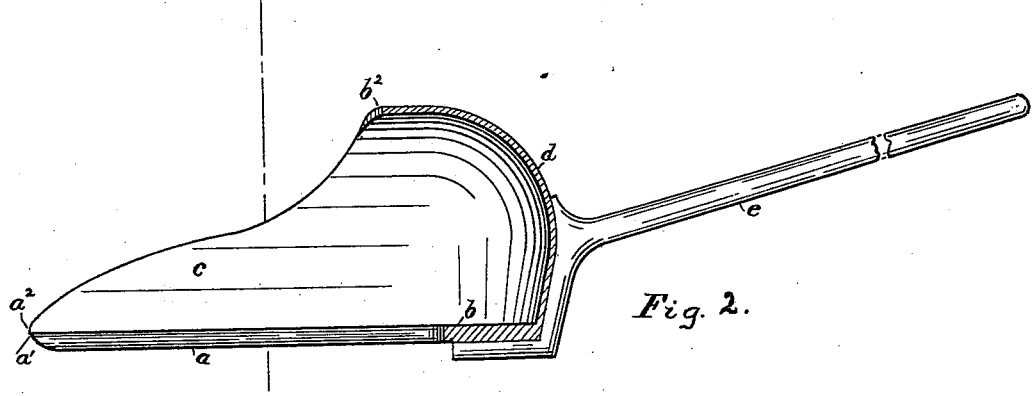
Figure 3:
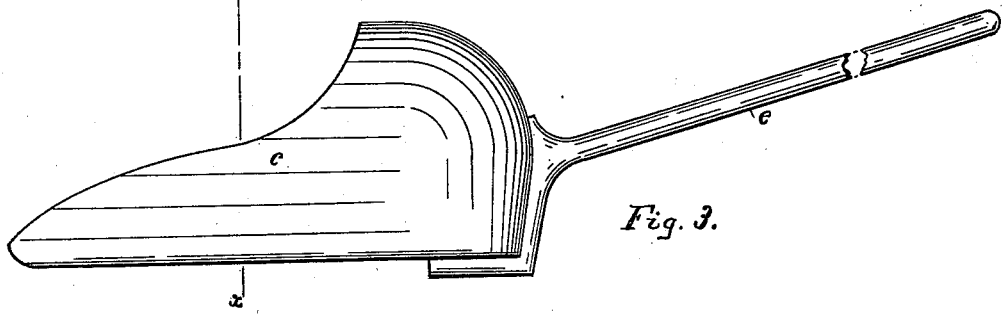
Figure 4:
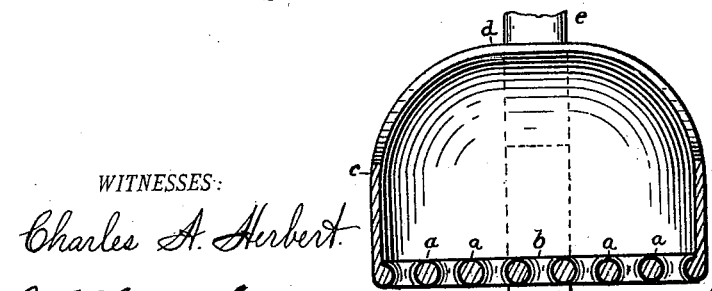

Figure 1 is a plan view, Fig. 2 is a longitudinal sectional view, and Fig. 3 is a side view, of a sifting-shovel made according to my said invention. Fig. 4 is a transverse sectional view taken in the line $x\ x$ of Figs. 1, 2, and 3.

The bottom of the shovel is composed of the tines $a$, which should be pointed more or less at their extremities $a'$, and which extend back to the shelf $b$.

At each side of the bottom $a\ a$, &c., are lateral flanges or side pieces $c$, which extend back from the front end of the shovel upward and backward to the hood $d$ and connect with the sides of the latter, all substantially as indicated, as from $a^2$ to $b^2$, in Fig. 2 and in the corresponding parts of the drawings. This hood extends from the rear part of the shelf $b$ upward and forward, and is preferably of rounded contour, as shown in the drawings. The tines $a$ should be circular in their cross-section so that the upper parts of the spaces between them may have a hopper-like action to gather and guide the dust and similar comminuted material downward to and through said spaces, while the under portion of said spaces is flaring to permit the rapid escape of such dust and smaller material.

The shovel is provided with a suitable rearwardly-extending handle $e$, whereby it may be handled and manipulated.

In the use and operation of the apparatus the material to be shoveled is placed upon the bottom of the shovel in the same manner as upon any other shovel, and is supported upon the tines $a$, which, as represented in the drawings, are open and clear from each other at the front of the implement. The shovel is then shaken to any requisite extent, and the dust and finer particles pass down and out between the tines, leaving the coarser material cleansed therefrom and remaining upon the shovel, to be thence transferred as occasion may require.

The advantages arising from the several features of my said invention are as follows: The tines, being circular or round in their cross-section, facilitate the sifting, as hereinbefore explained. The side pieces $c$ not only prevent the material from falling off at the sides of the implement, but, being extended upward and backward to join with the hood $d$, tend to guide the material back into the latter and also increase the capacity of the shovel. The shelf $b$ enables the shovel itself to be carried back to a material distance behind that part composed of the tines $a$ without interfering with the requisite rapidity and thoroughness of the sifting operation throughout the latter, and the hood $d$ not only serves to prevent the material from passing off at the rear of the shovel, but from its peculiar arrangement facilitates the downward movement of the mass of material when shaken at the back of the shovel, and thereby provides a circulation of the material upon the bottom of the shovel, which tends greatly to facilitate the discharge of the dust, comminuted material, &c., and, moreover, said hood, to a great extent, prevents the dust from the shaken material from rising backward toward the person of the operator, and thereby renders the use of the implement cleanly and convenient. The shovel is preferably made of steel or iron, but it may be made of any material which will be suitable for its intended use.

The special use of the shovel is to take the mingled ashes and partly-consumed coal from the ash-pit of a house furnace or stove, and by shaking the shovel separate the coal particles from the ashes. The shovel, by reason of its peculiar construction, enables such motion to be given to the material on the device as will most readily cause the separation of the ashes and their passage downward and out into a receptacle, leaving the coal particles upon the device, and thus save for use material that is ordinarily wasted.

In the drawings the handle is shown secured to the back of the closed hood and formed with a bent arm, which fits under the closed shelf $b$; but the handle may be secured in any suitable manner.

What I claim as my invention is—

1. The combination, in a sifting-shovel, of the tines $a$, open at the front, the closed side pieces $c$, the closed hood $d$, and the closed shelf $b$, arranged in relation with the side pieces and hood substantially as and for the purpose herein set forth.

2. The combination, in a sifting-shovel, of the tines $a$, circular or cylindrical in their cross-section and open at the front, the closed side pieces $c$, the closed hood $d$, and the closed shelf $b$, arranged in relation to the side pieces and hood substantially as and for the purpose herein set forth.

MARIA J. CUSHING.

Witnesses:
CHARLES A. HERBERT,
CHARLES JOHNSON.